(12) United States Patent
Stewart et al.

(10) Patent No.: US 6,411,923 B1
(45) Date of Patent: Jun. 25, 2002

(54) TOPOLOGY ANALYSIS TOOL FOR USE IN ANALYZING A PROCESS CONTROL NETWORK DESIGN

(75) Inventors: Wade C. Stewart, Pflugerville; David M. Hyde, Cedar Park; Deborah R. Colclazier, Round Rock; Doyle E. Broom, Georgetown, all of TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/070,140

(22) Filed: Apr. 30, 1998

(51) Int. Cl.[7] .............................................. G06F 13/00

(52) U.S. Cl. ........................... 703/25; 703/21; 703/27; 716/6; 714/43; 700/11

(58) Field of Search .......................... 703/1, 2, 21, 25, 703/27, 24; 714/39, 43; 710/18, 100; 702/97; 364/152; 700/10, 2, 11, 87; 716/6

(56) References Cited

U.S. PATENT DOCUMENTS

| | | | | |
|---|---|---|---|---|
| 5,307,346 A | * | 4/1994 | Fieldhouse | 370/85.1 |
| 5,748,896 A | * | 5/1998 | Daly et al. | 395/200.53 |
| 5,828,851 A | * | 10/1998 | Nixon et al. | 395/285 |
| 5,850,523 A | * | 12/1998 | Gretta, Jr. | 395/200.54 |
| 5,909,368 A | * | 6/1999 | Nixon et al. | 364/131 |
| 5,940,294 A | * | 8/1999 | Dove | 364/188 |
| 6,044,305 A | * | 3/2000 | Larson et al. | 700/87 |

FOREIGN PATENT DOCUMENTS

| | | | | |
|---|---|---|---|---|
| GB | 2324180 | 10/1988 | | G06F/17/50 |
| WO | WO 98/15906 | 4/1998 | | G06F/17/50 |

* cited by examiner

*Primary Examiner*—Kevin J. Teska
*Assistant Examiner*—T. Phan
(74) *Attorney, Agent, or Firm*—Marshall, Gerstein & Borun

(57) ABSTRACT

The present invention is directed to an analysis tool for aiding in the design of a process control system which conforms to a standard protocol. Such a tool advantageously allows the efficient design of a process control system while ensuring that the physical characteristics of the system conform to the standard.

28 Claims, 21 Drawing Sheets

Project Data

| F-R Industry Solutions |
|---|
| FIELD BUS |
| *FISHER - ROSEMOUNT*<br>*Managing The Process Better* |

Customer and Sales Office Information

| | |
|---|---|
| Company Name | Acme Industrial Supplies |
| Company Location | Greater Sahara Desert |
| Customer Contact | W. E. Coyote |
| Sales Office | FRSI - Austin Engineering Center |
| Sales Office Contact | Deborah R. Colclazier |

H1 Card 1      Summary of Information

SEGMENT 1

| | | |
|---|---|---|
| Power Supply | 24.00 | volts |
| Minimum Device Voltage | 18.93 | volts |
| Total Current Draw | 264.00 | mA |
| Total Number of Devices | 14 | instruments |
| Total Segment Length | 4.25% | of standard |
| Maximum Spur Length Allowed | 295.00 | feet |
| Max Spur Length | 50.00 | feet |

SEGMENT 2

| | | |
|---|---|---|
| Power Supply | 24.00 | volts |
| Minimum Device Voltage | 18.96 | volts |
| Total Current Draw | 12.00 | mA |
| Total Number of Devices | 1 | instruments |
| Total Segment Length | 4.41% | of standard |
| Maximum Spur Length Allowed | 394.00 | feet |
| Max Spur Length | 25.00 | feet |

*FIG. 11A*

Project Data

Summary of Information

H1 Card 2

SEGMENT 1
| | |
|---|---|
| Power Supply | 24.00 volts |
| Minimum Device Voltage | 18.88 volts |
| Total Current Draw | 72.00 mA |
| Total Number of Devices | 4 instruments |
| Total Segment Length | 4.25% of standard |
| Maximum Spur Length Allowed | 394.00 feet |
| Max Spur Length | 120.00 feet |

SEGMENT 2
| | |
|---|---|
| Power Supply | 24.00 volts |
| Minimum Device Voltage | 18.99 volts |
| Total Current Draw | 40.00 mA |
| Total Number of Devices | 2 instruments |
| Total Segment Length | 0.48% of standard |
| Maximum Spur Length Allowed | 394.00 feet |
| Max Spur Length | 10.00 feet |

*FIG. 11B-1*

Project Data — Summary of Information

H1 Card 3

SEGMENT 1

| | | |
|---|---|---|
| Power Supply | 0.00 volts | |
| Minimum Device Voltage | -5.00 volts | Excessive Voltage Drop |
| Total Current Draw | 0.00 mA | |
| Total Number of Devices | 0 instruments | |
| Total Segment Length | 0.00% of standard | |
| Maximum Spur Length Allowed | 394.00 feet | |
| Max Spur Length | 120.00 feet | |

SEGMENT 2

| | | |
|---|---|---|
| Power Supply | 0.00 volts | |
| Minimum Device Voltage | -5.00 volts | Excessive Voltage Drop |
| Total Current Draw | 0.00 mA | |
| Total Number of Devices | 0 instruments | |
| Total Segment Length | 0.00% of standard | |
| Maximum Spur Length Allowed | 394.00 feet | |
| Max Spur Length | 0.00 feet | |

*FIG. 11B-2*

Project Data

H1 Card 4 — Summary of Information

SEGMENT 1

| Power Supply | 0.00 volts | |
|---|---|---|
| Minimum Device Voltage | -5.00 volts | *Excessive Voltage Drop* |
| Total Current Draw | 0.00 mA | |
| Total Number of Devices | 0 instruments | |
| Total Segment Length | 0.00% of standard | |
| Maximum Spur Length Allowed | 394.00 feet | |
| Max Spur Length | 0.00 feet | |

SEGMENT 2

| Power Supply | 0.00 volts | |
|---|---|---|
| Minimum Device Voltage | -5.00 volts | *Excessive Voltage Drop* |
| Total Current Draw | 0.00 mA | |
| Total Number of Devices | 0 instruments | |
| Total Segment Length | 0.00% of standard | |
| Maximum Spur Length Allowed | 394.00 feet | |
| Max Spur Length | 0.00 feet | |

*FIG. 11C*

TOPOLOGY ANALYSIS TOOL FOR USE IN ANALYZING A PROCESS CONTROL NETWORK DESIGN

BACKGROUND OF THE INVENTION

1. Field of the Invention

The present invention relates generally to process control networks and more particularly to tools for analyzing process control network designs.

2. Description of the Related Art

Large processes such as chemical, petroleum and other manufacturing and refining processes include numerous field devices disposed at various locations within a facility to measure and control process parameters which thereby effect control of the process. These devices may be, for example, sensors such as temperature, pressure and flow rate sensors as well as control elements such as valves and switches. Historically, the process control industry used manual operations such as manually reading level and pressure gauges, turning valve wheels, etc., to operate the measurement and control field devices within a process. Beginning in the 20th century, the process control industry began using local pneumatic control, in which local pneumatic controllers, transmitters and valve positioners were placed at various locations within a process plant to effect control of certain plant locations. With the emergence of the microprocessor-based distributed control system of the 1970's, distributed electronic process control became prevalent in the process control industry.

A distributed control system includes an analog or digital computer, such as a programmable logic controller, connected to numerous electronic monitoring and control devices, such as electronic sensors, transmitters, current-to-pressure transducers, valve positioners, etc. located throughout a process. The DCS computer stores and implements a centralized and, frequently, complex control scheme to effect measurement and control of process parameters according to an overall control scheme. Usually, however, the control scheme implemented by a DCS is proprietary to the DCS manufacturer. Thus making the DCS difficult and expensive to expand, upgrade, reprogram and/or service because the DCS provided must become involved in an integral way to perform any of these activities. Furthermore, the equipment that can be used by or connected to any particular DCS may be limited due to the proprietary nature of the DCS and that a DCS provided may not support certain devices or functions of devices manufactured by other vendors.

To overcome some of the problems inherent in the use of proprietary DCSs, the process control industry has developed a number of standard, open communication protocols including, for example, the HARTS®, DE, PROFIBUS®, WORLDFIP®, LONWORKS®, Device-Net®, and CAN protocols. These standard protocols enable field devices made by different manufactures to be used together within the same process control environment. In theory, any field device that conforms to one of these protocols can be used within a process to communicate with and to be controlled by a DCS or other controller that supports the protocol, even if that field device is made by a different manufacturer that the DCS manufacturer.

There is now a move within the process control industry to decentralize process control and, thereby, simplify DCS controllers, or to a large extent, eliminate the need for DCS controllers. Decentralized control is provided by having process control devices, such as valve positioners, transmitters, etc. perform one or more process control functions and by then communicating data across a bus structure for use by other process control devices. To implement control functions, each process control device includes a microprocessor having the capability to perform one or more basic control functions as well as the ability to communicate with other process control devices using a standard and open protocol. In this manner, field devices made by different manufacturers can be interconnected within a process control loop to communicate with one another and to perform one or more process control functions or control loops without the intervention of a DCS. One example of an open communication protocol that allows devices made by different manufacturers to interoperate and communicate with one another via a standard bus to effect decentralized control within a process is the FOUNDATION Fieldbus protocol (hereinafter the "Fieldbus protocol") by the Fieldbus Foundation. The Fieldbus protocol is an all digital, two-wire loop protocol.

When using these protocols, a challenge associated with designing the process control system or network relates to the actual physical layout and interconnection of the various process control devices. Specifically, each of these protocols sets forth constraints of values for the physical characteristics within which a process control system must operate to conform to the standard. These constraints include the voltage drop across communication sections, the spur length, the overall cable length, the total current draw and the total number of process control devices on a particular hub. The interrelationship of these constraints are important and variable based upon the values of the constraints.

Presently, when designing a process control system, the physical layout of the system is designed and physically drawn and then the values of the physical characteristics of the system are calculated and recalculated by hand to determine whether the values are within the constraints set forth by a particular protocol. This process can be time consuming as the values of the physical characteristics are interrelated and changing. One change in value may require the recalculation of the values of the physical characteristics of the entire process control environment.

SUMMARY OF THE INVENTION

The present invention is directed to an analysis tool for aiding in the design of a process control system which conforms to a standard protocol. Such a tool advantageously allows the efficient design of a process control system while ensuring that the physical characteristics of the system conform to the standard.

One aspect of the invention is directed to a method for analyzing a process control network design to meet criteria of a standard protocol. The process control network includes a controller coupled to a field device via a bus. The method includes a software analysis tool having access to information regarding standard protocol criteria including a length of the bus, a cable type of the bus and a voltage requirement of the field device for analysis by the tool to assure that the process control network design conforms to the criteria of the standard protocol.

BRIEF DESCRIPTION OF THE DRAWINGS

The present invention may be better understood, and its numerous objects, features, and advantages made apparent to those skilled in the art by referencing the accompanying drawings.

FIGS. 11A–11C is a screen presentation of the summary portion of the topology analysis tool of FIG. 2.

DETAILED DESCRIPTION

While the topology analysis tool of the present invention is described in detail in conjunction with a process control system that implements process control functions using Fieldbus devices, it should be noted that the topology analysis tool of the present invention can be used with process control systems that include other types of field devices and communication protocols, including protocols that rely on other than two-wire buses and protocols that support only analog or both analog and digital communications. Thus, for example, the topology analysis tool of the present invention can be used in any process control system that communicates using the HART, PROFIBUS, etc. communication protocols or any other communication protocols that now exist or that may be developed in the future.

Before discussing the details of the topology analysis tool of the present invention, a general description of the Fieldbus protocol, field devices configured according to this protocol, the way in which communication occurs in a process control environment that implements the Fieldbus protocol, and example constraints of values that are required under the Fieldbus protocol will be provided. However, it should be understood that the Fieldbus protocol is known in the art and is described in detail in numerous articles, brochures and specifications published, distributed and available from, among others, the Fieldbus Foundation, a not-for-profit organization located in Austin, Tex. In particular, the Fieldbus protocol including constraints of values that are required under the Fieldbus protocol is described in detail in "Wiring and Installation 31.25 Kbits/sec. Voltage Mode Wire Medium Application Guide" Foundation Fieldbus, 1996.

Generally, the Fieldbus protocol is a digital, serial, two-way communication protocol that provides a standardized physical interface to a two-wire loop or bus interconnecting process control equipment such as sensors, actuators, controllers, valves, etc. included within an instrumentation or process control environment. The Fieldbus protocol provides, in effect, a local area network for field instruments (field devices) within a process, which enables these devices to perform control functions at locations distributed throughout a process and to communicate with one another before and after the performance of these control functions to implement an overall control strategy. Because the Fieldbus protocol enables control functions to be distributed throughout a process control network, the protocol reduces the complexity of, or entirely eliminates the necessity of, the centralized process controller typically associated with a DCS.

Figure 1:
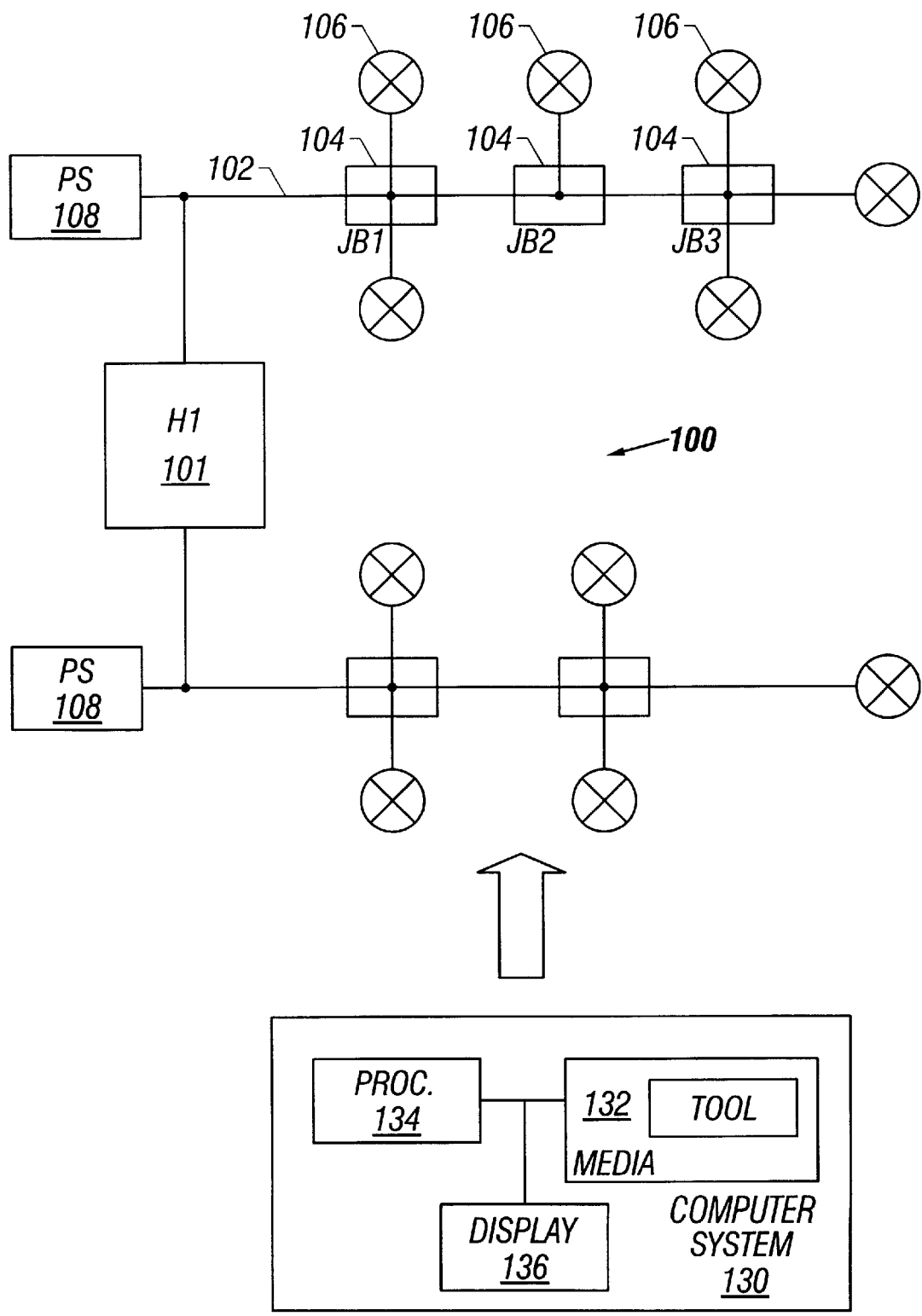
FIG. 1 is a schematic block diagram of a process control network analyzed using a topology analysis tool in accordance with the present invention.

Referring to FIG. 1, a process control network 100 conforming to the Fieldbus protocol includes a host 101 (H1) which is coupled to a plurality of field devices via a bus 102. The bus 102 includes a plurality of sections or segments having corresponding lengths as well as other characteristics. The bus 102 also may include one or more junction boxes 104 (JB1, JB2, JB3), which are often referred to as "bricks." Each junction box 104 may couple one or more field bus devices 106 to the bus 102. Host 101 is also coupled to at least one power supply 108. Initially, process control network 100 also includes a computer system 130 having an analysis tool 120 which is used during the design of the process control network to ensure that the process control network corresponds to a desired standard protocol, e.g., the Fieldbus protocol. Analysis tool 120 is preferably a software package that is contained on computer readable media 132 and is executed by a processor 134 of computer system 130. The computer readable media may be volatile or non-volatile memory, a floppy disc, a CDROM or any other type of media on which a software package may be contained. The tool 120 enables screen presentations that are presented on display 136 of computer system 130. The network illustrated in FIG. 1 is illustrative only, there being many other ways in which a process control network may be configured using the Fieldbus protocol.

Process control network 100 includes a number of physical characteristics such as the voltage drop across communication sections, the spur length of a particular communication section, the overall length of the bus, the total current draw of a segment, and the total number of process control devices coupled to a particular junction box. Analysis tool 120 analyzes these physical characteristics to determine whether the process control network corresponds to the desired standard protocol.

Figure 2:
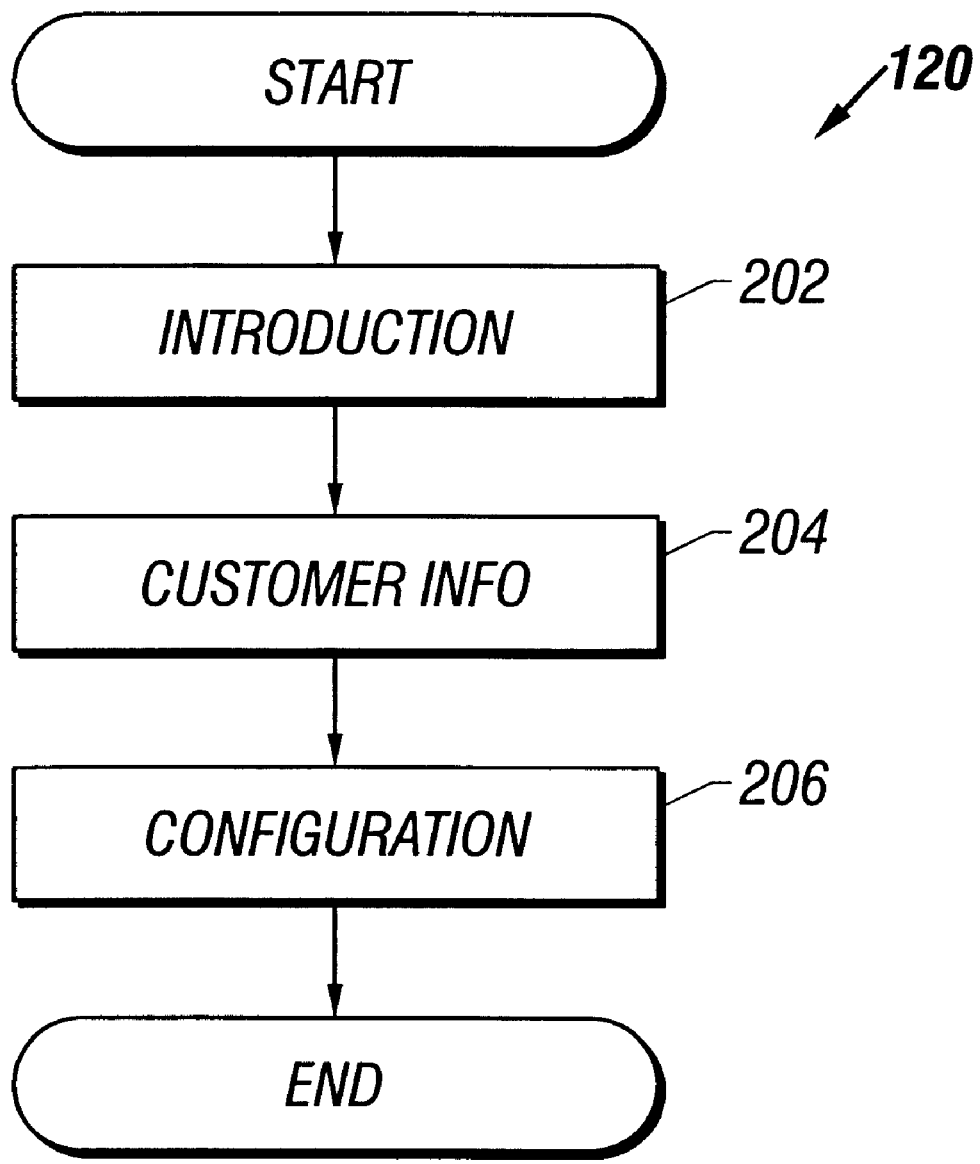
FIG. 2 is a flow chart illustrating the operation of a topology analysis tool in accordance with the present invention.

Referring to FIG. 2, a flow diagram illustrating the function of the analysis tool 120 is shown. When designing a process control network, analysis tool 120 provides an efficient way of ensuring that the design conforms to the constraints set forth by a particular protocol. More specifically, when tool 120 is accessed, an introductory portion 202 is presented which identifies the standard against which to network design is to be analyzed. The introductory portion 202, as well as the rest of the tool 120, operates according to a "Wizard" functionality as is present in various programs which run under a WINDOWS™ operating system. After the introductory portion 202 is viewed, the user then transfers to a customer information portion 204 by actuating a "NEXT" button or the like. If the user does not want to proceed then the user can exit the tool by actuating an "EXIT" button or the like.

At the customer information portion 204, information about the customer is provided to the tool. This information may include the name of the customer, the name of the company, the location of the facility at which the network is located, the name of the representative providing the tool and the name of a contact for that representative. After the information is entered, the user actuates an "OK" button or the like, which then causes the tool to transfer to the card configuration portion 206.

The card configuration portion 206 provides the user with a way of providing the tool with information relating to the physical characteristics of the process control network. The card configuration portion 206 may also provide the user with a number of operations which are used for analyzing a process control network 100. Additionally, the card configuration portion 206 may provide the user with a way of obtaining a bill of materials for the process control network design. After the information for the process control network has been analyzed and a bill of materials is generated, the operation of the tool is complete and the user has an analysis of the process control network which conforms to the desired standard.

Figure 3:
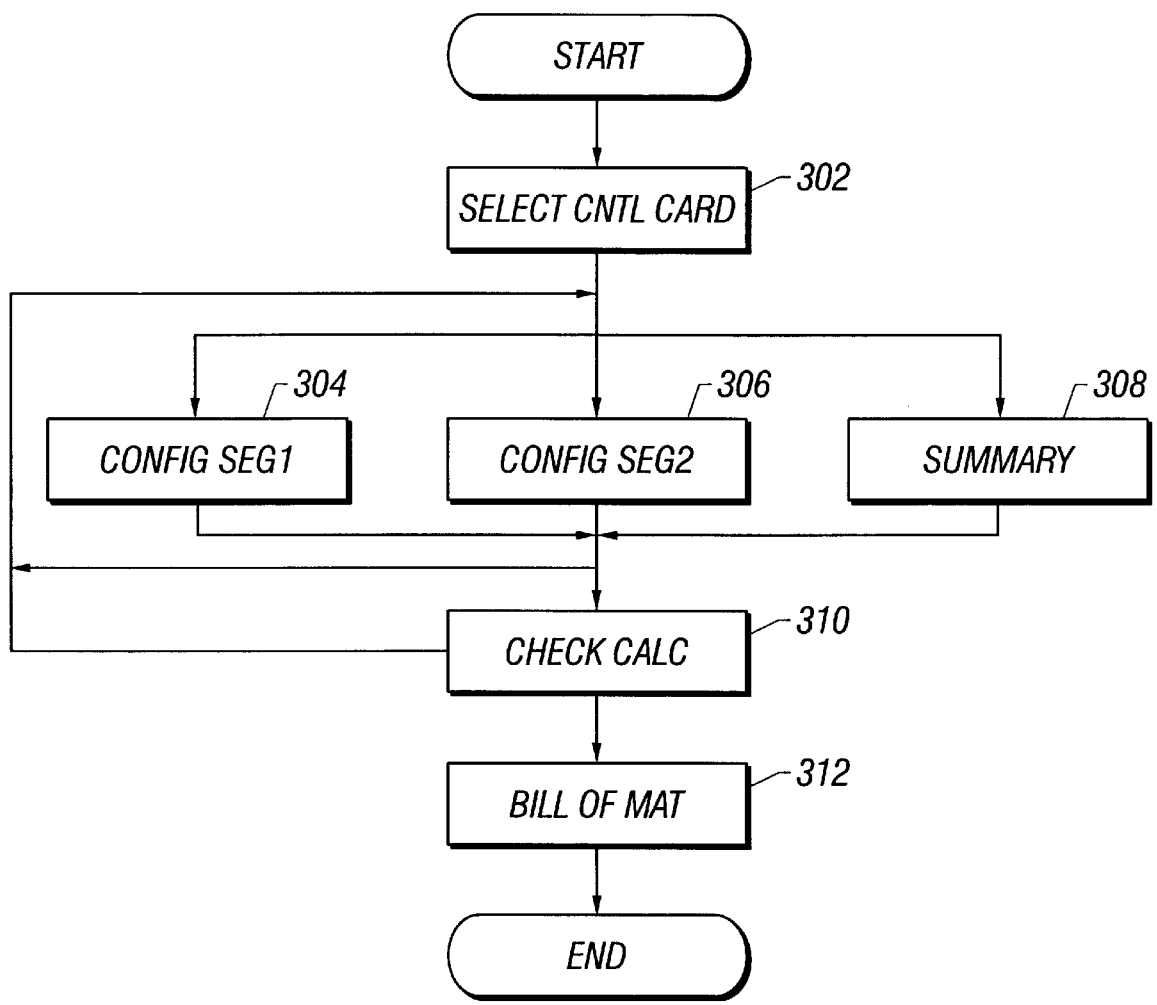
FIG. 3 is a flow chart illustrating the operation of the card configuration portion of the topology analysis tool of FIG. 2.

FIG. 3 is a flow chart illustrating the operation of the card configuration 206 shown in FIG. 2. At step 302 of card configuration portion 206 a user selects a controller card from the available listed controller cards (see, e.g., FIG. 4). After the card is selected, then the pertinent information for the selected controller card may be provided to the analysis tool. Essentially, by selecting a controller card, the user configures a segment of the network. In the preferred embodiment, each controller card may control two segments; however, depending upon the controller card more of less segments may be controlled by a controller card. Once the first segment is configured at configure segment 1 step 304, then the second segment is configured at configure segment 2 step 306. While the segments are being configured, the user may access a summary of the information that has been provided to the tool 120 as indicated by access Summary Worksheet portion 308. After the segments have been configured, the tool analyzes the relevant data to determine whether the process control network design conforms to the appropriate standard via check calculations step 310. If the design conforms to the criteria of the standard then the tool provides the user with a message to this effect and the operation of the tool is completed. If the design does not conform to the criteria for the standard, then the user may return to the configuration steps 304, 306 to adjust the design of the portions that do not meet the criteria. In this way, a user may iteratively design a process control network so that the design conforms to criteria set forth by a standard protocol. Additionally, whether or not the design conforms to the criteria, a user may access bill of materials portion 312. Bill of materials portion 312 generates a bill of materials based on the process control network design that is configured by the user.

Figure 4:
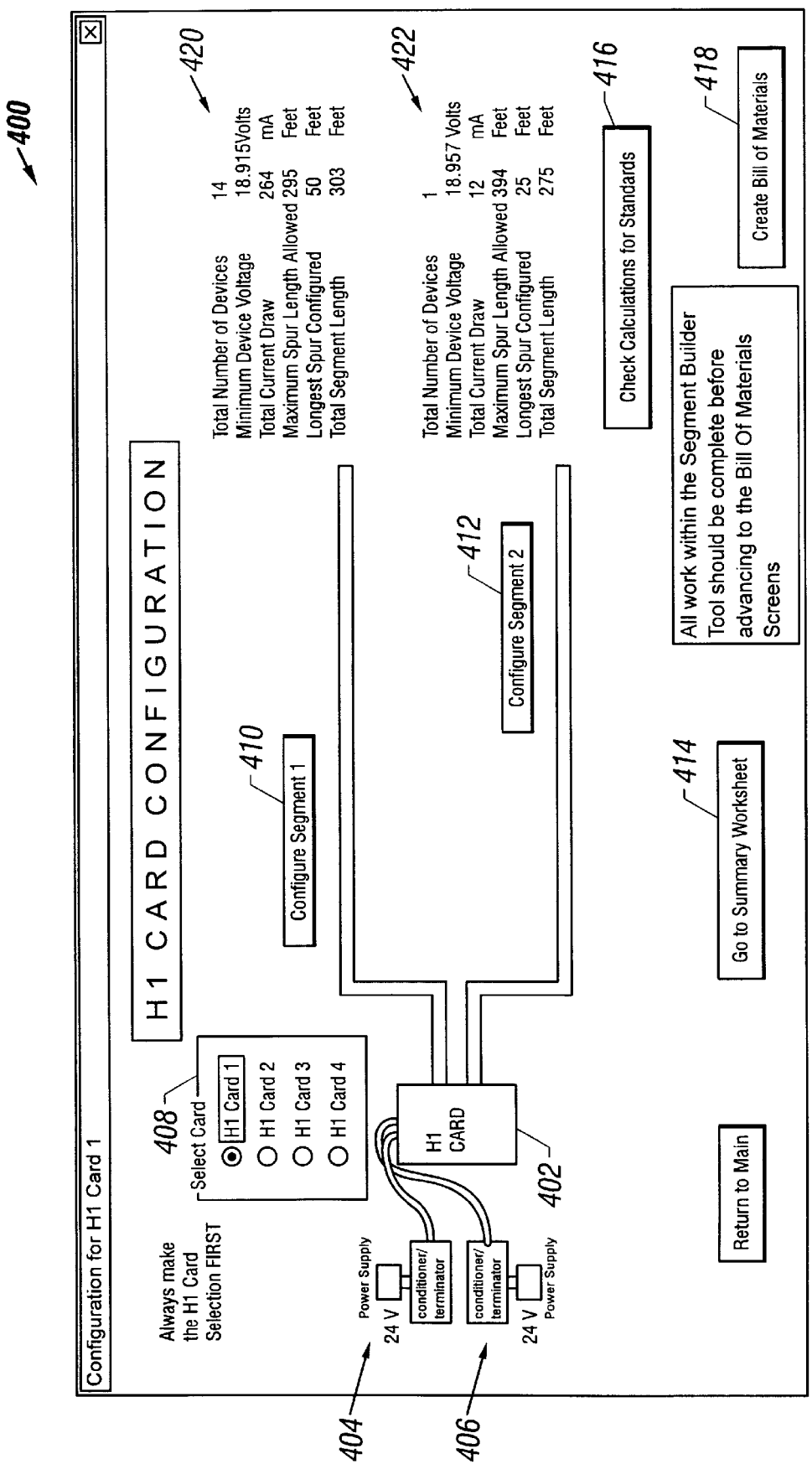
FIG. 4 is a screen presentation of the card configuration portion of the topology analysis tool of FIG. 2.

Referring now to FIG. 4, a screen presentation of the card configuration portion 206 of FIG. 2 is shown. The card configuration screen presentation 400 of the topology analysis tool 120 includes a plurality of sections that substantially correspond to the functionality of the card configuration portion of the topology analysis tool. More specifically, the card configuration screen presentation 400 includes a representation of a controller card 402 to which power supplies 404, 406 are coupled. Card configuration screen presentation 400 also includes select card portion 408 via which a user selects the controller card, and thus the portion of the process control network, to be configured. Card configuration screen presentation 400 also includes configure segment 1 portion 410 and configure segment 2 portion 412 which are coupled to the controller card. Card configuration screen presentation 400 also includes worksheet portion 414 via which a user may access a summary of the information that is contained within the tool for a particular process control network. Card configuration screen presentation 400 also includes check calculations portion 416 via which a user may analyze the configurations of the various segments of the process control network. Card configuration screen presentation 400 also includes bill of materials portion 418 via which a user may access a bill of materials for the process control network. Card configuration screen presentation 400 also includes segment 1 information portion 420 and segment 2 information portion 422.

Segment 1 information portion 420 and segment 2 information portion 422 provide information regarding the configuration of the respective segments that are coupled to the controller. More specifically, each of these information portions provides information regarding the total number of devices that are coupled to a segment, the minimum device voltage of these devices, the total current draw of the segment, the maximum spur length allowed by the protocol based upon the number of devices that are coupled to the segment, the longest spur length of the configured process control network and the total segment length of the design.

Figure 5:
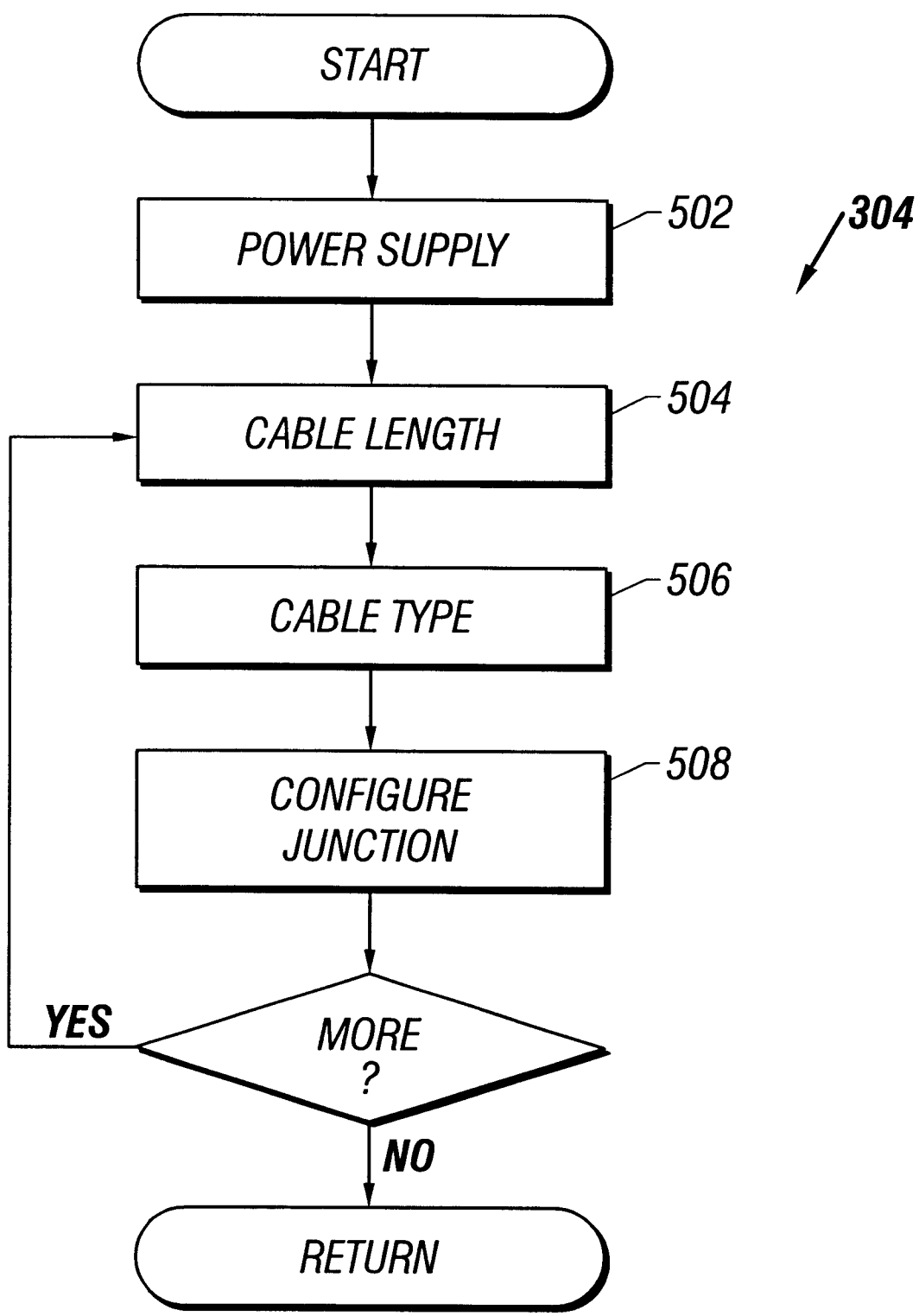
FIG. 5 is a flow chart illustrating the operation of the configure segment portion of the topology analysis tool of FIG. 2.

Referring now to FIG. 5, a flow chart illustrating the operation of a configure segment portion 304, 306 is shown. The operation of the configure segment portion 304, 306 of tool 120 is similar for the configure segment 1 portion 304 of the tool 120 and the configure segment 2 portion 306 of the tool 120. More specifically, at power supply step 502, the voltage of the power supply is provided by the user. Next, at cable length step 504, the length of a segment of cable from a controller to a junction or from a junction to another junction is provided by a user. At cable type step 506, the cable type is provided by the user. The cable type includes information about the gauge of the wire that is used within the cable as well as other characteristics of the cable. After supplying cable type information, the configure junction portion of the tool is accessed to allow a user to configure a junction of the process control network at configure junction step 508. Next, if there are other devices to configure, the user then returns to cable length step 504 provide information about the next cable length. It will be appreciated that while FIG. 5 shows a flow chart having a certain order of events, any other order in which the information is provided to the tool is within the scope of the invention.

Figure 6A:
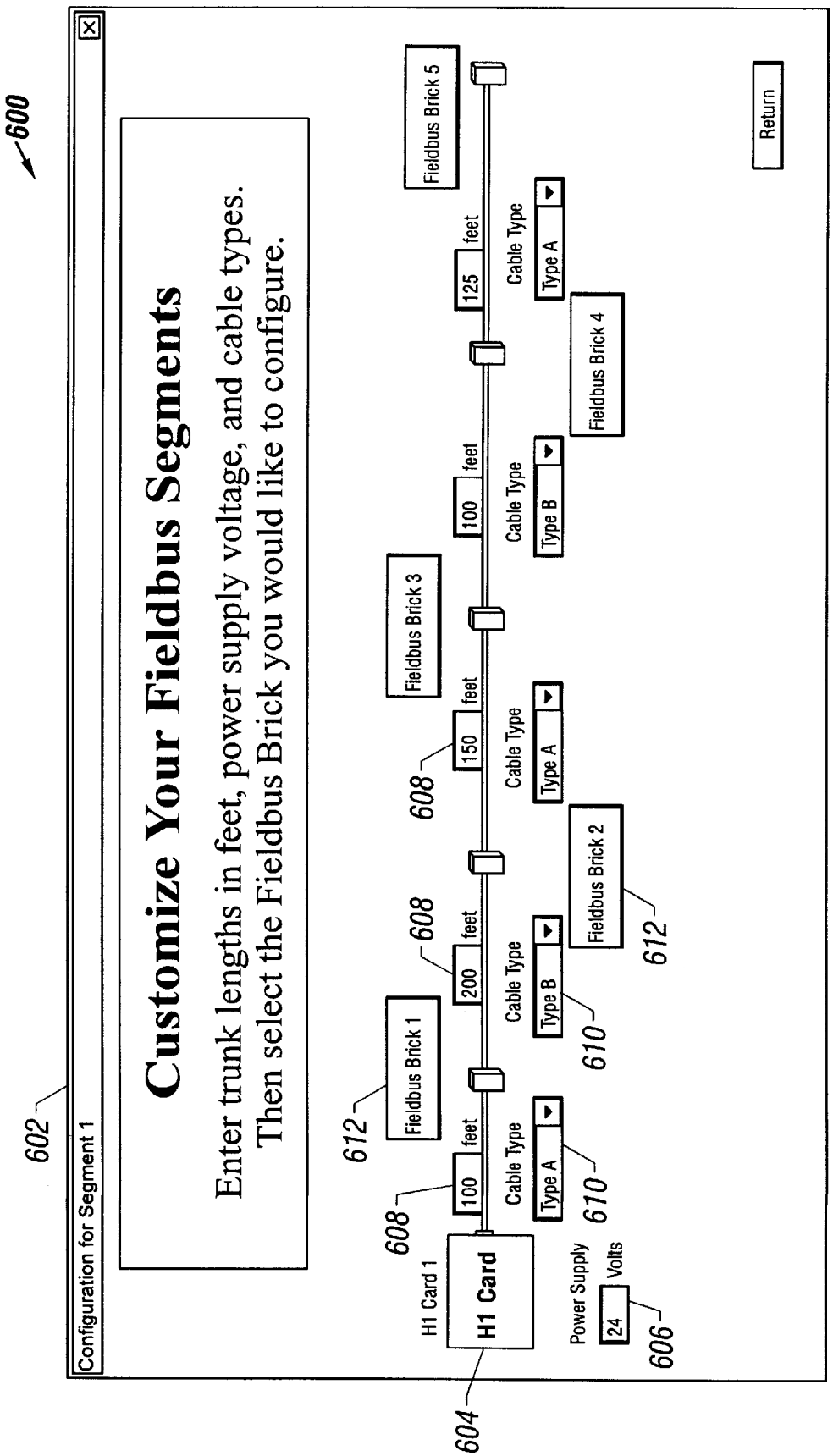
FIGS. 6A and 6B are screen presentations of the configure segment portion of the topology analysis tool of FIG. 2.
Figure 6B:
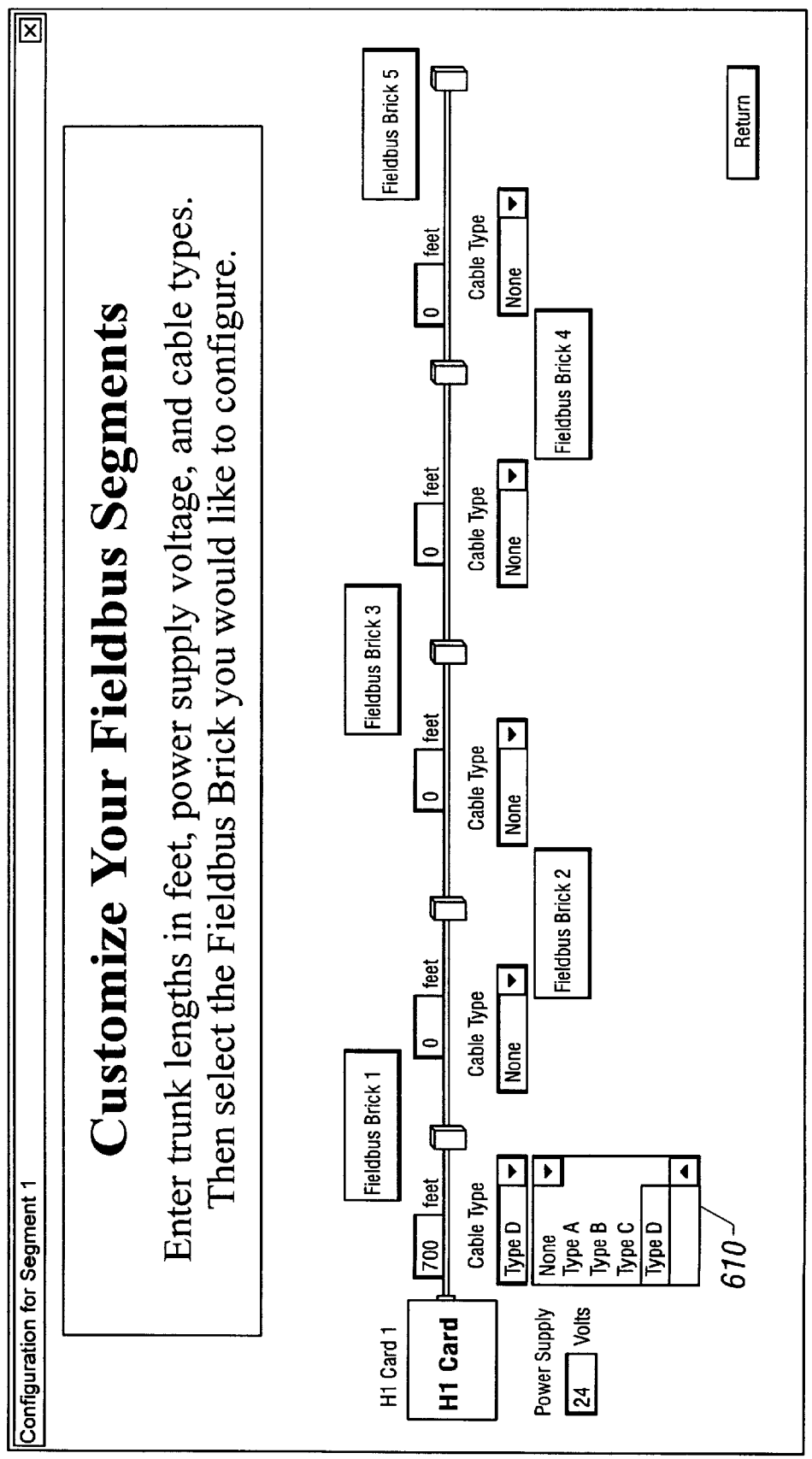

Referring to FIGS. 6A and 6B, the configure segment screen presentation 600 includes a plurality of sections that substantially correspond to the functionality of the configure segment portion of topology analysis tool 120. More specifically, the configure segment screen presentation 600 includes a segment identification portion 602 which identifies which segment is being configured. Configure segment screen presentation 600 may further include card identification portion 604 which identifies the controller which corresponds to the card segment that is being configured. Configure segment screen presentation may further include power supply input portion 606 via which a user provides the tool 120 with the voltage of the power supply that is used by the segment of the process control network. Configure segment screen presentation 600 also includes a plurality of cable length portions 608, which, as indicated, a user provides the tool 120 with the lengths of the various cables that are used by the segment of the process control network. Configure segment screen presentation 600 also includes a plurality of cable type portions 610, which a user provides the tool 120 with the type of cables that are used by the segment of the process control network. The cable types preferably are accessed via pull down menus, which provide the user with choices regarding cable type (See, e.g., FIG. 6B). Configure segment screen presentation 600 also includes a plurality of configure junction portions 612, which allow a user to configure respective junctions of the process control network.

Figure 7:
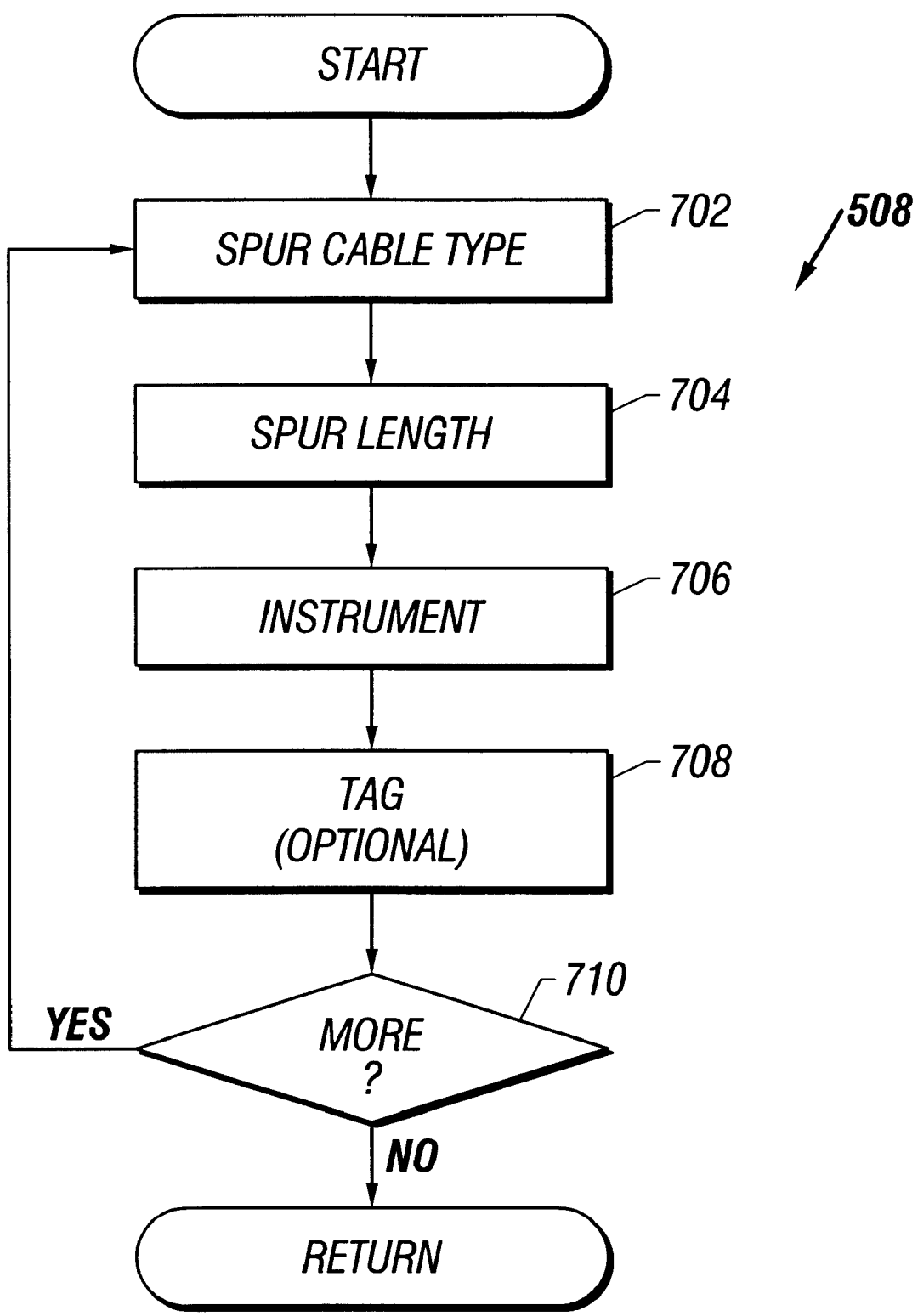
FIG. 7 is a flow chart illustrating the operation of the configure junction portion of the topology analysis tool of FIG. 2.

When the configure junction portion of analysis tool 120 is accessed, the user provides information regarding devices that are coupled to the junction and how the coupling to the junction is configured. More specifically, at spur cable type step 702 (FIG. 7), the user selects the type of cable that is coupled between the junction and the device. The user then provides the length of the spur at spur length step 704. Next, at instrument step 706, the user selects the type of instrument that is coupled to the junction box. In the preferred embodiment, the instrument is a device that conforms to the Fieldbus protocol. The user may then optionally assign a tag identification to the instrument. If there are no more instruments to configure as indicated at step 710, then the configure junction portion 508 completes and control returns to configure segment portion. If there are other instruments to configure, then the user selects the type of cable for the next device by returning to step 702 and the process continues. It will be appreciated that while FIG. 7 shows a flow chart having a certain order of events, any other order in which the information is provided to the tool is within the scope of the invention.

Figure 8A:
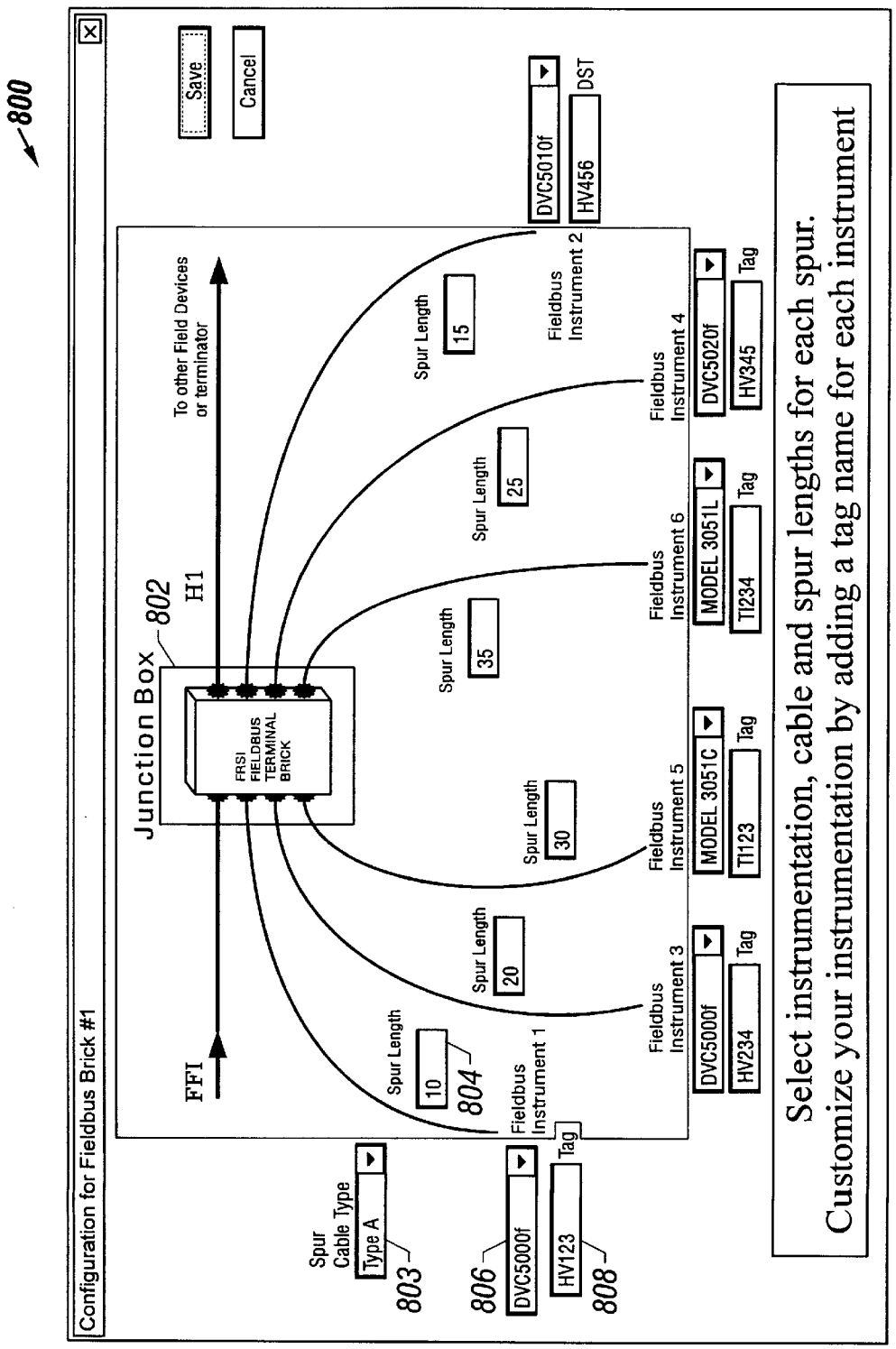
FIGS. 8A and 8B are screen presentations of the configure junction portion of the topology analysis tool of FIG. 2.
Figure 8B:
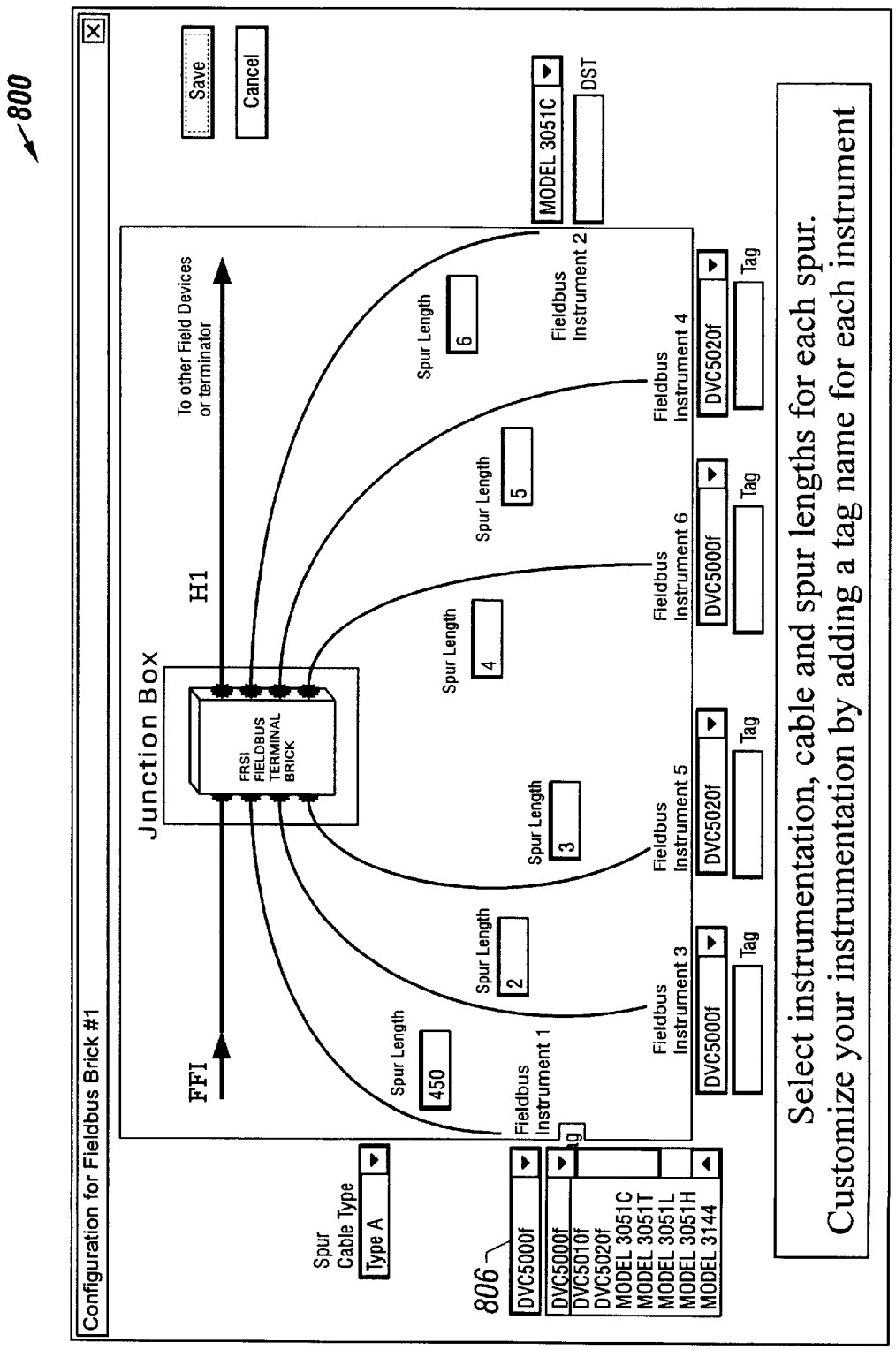

Referring to FIGS. 8A and 8B, the configure junction screen presentation 800 includes a plurality of sections that substantially correspond to the functionality of the configure junction portion of topology analysis tool 120. More specifically, the configure junction screen presentation 800 includes a junction identification portion 802 which identifies the junction (i.e., brick 104 of FIG. 1) being configured. Configure junction screen presentation 800 also includes a plurality of spur cable type portions by which a user provides the tool with the type of cables that are used by respective spurs of the process control network. The cable types are preferably accessed via pull down menus which provide the user with choices regarding cable type. Configure junction screen presentation 800 also includes a plurality of spur cable length portions 804 via which, as illustrated, a user provides the tool 120 with the lengths of the various cables that are coupled between the junction box and the instrument. Configure junction screen presentation 800 may also include a plurality of instrument type portions 806 via which a user provides the tool with the type of instrument that is coupled to the spur. The instrument types are accessed via pull down menus which provide the user with choices regarding the instrument type (see, e.g., FIG. 8B). Configure junction screen presentation 800 also includes a plurality of tag portions 808 via which a user may customize the instrument by adding a tag name for a respective instrument.

Figure 9:
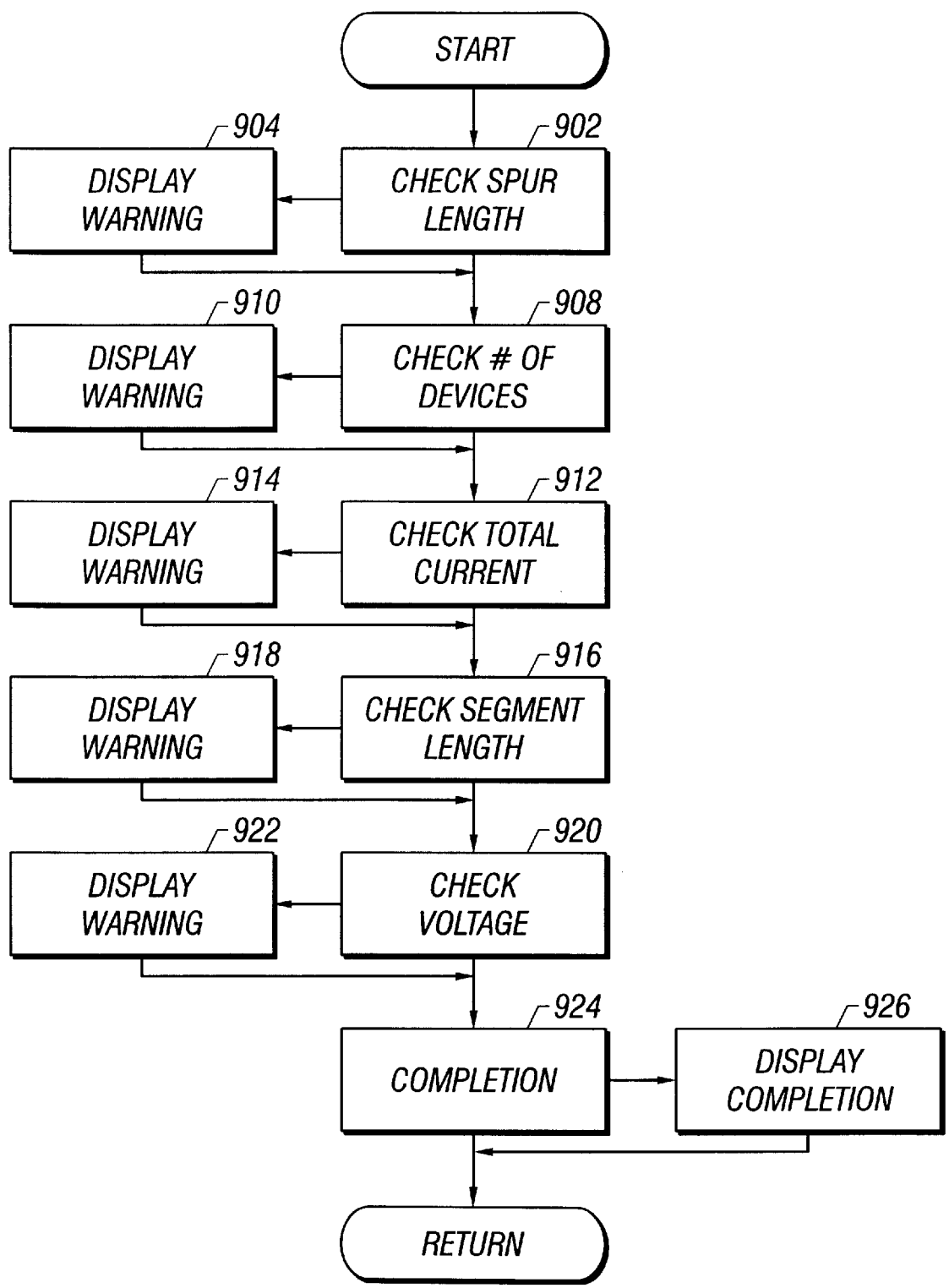
FIG. 9 is a flow chart illustrating to operation of the check calculations portion of the topology analysis tool of FIG. 2.

The check calculations portion 310 of the tool 120 will now be described. Referring to FIG. 9, when the check calculations portion of analysis tool 120 is accessed, the first criteria against which the process control network design is checked is at spur length step 902. During spur length step 902, all of the spur lengths of a segment are checked to assure that the spur lengths do not exceed a predetermined spur length as defined by the standard protocol. The spur lengths are limited by the number of instruments on the segment (per segment). I.e., the fewer the number of instruments, the longer the allowable spur length per segment. If the spur lengths exceed the predetermined spur length, then a warning message is presented as indicated at warning message step 904. If a warning message is presented, the number of devices are checked at check number of devices step 908. Otherwise, the tool 120 directly transitions to check number of devices step 908.

The number of devices per segment is checked to assure that the number of devices do not exceed a predetermined number of devices. The number of devices that are allowed may vary based upon the controller that is used by the process control network. In the preferred embodiment, the controller allows 16 devices to be coupled to the bus per segment. However, the present Fieldbus standard allows up to 32 devices to be coupled to the bus per segment. If the number of devices exceeds the predetermined number, then a warning message is presented to the user as illustrated at warning message step 910. If the warning message is presented, control transitions to check total current step 912. Otherwise, the tool 120 transitions directly to check total current step 912.

The total current draw per segment is checked to assure that the current draw does not exceed the maximum current draw allowed by the standard protocol. In the preferred embodiment, the maximum current draw allowed is 375 mAmps/segment. If the current draw exceeds the allowed maximum current draw, then a warning message is presented to the user as indicated at warning message step 914. If the warning message is presented, control transitions to check segment length step 916. Otherwise, tool 120 transitions directly to check segment length step 916.

The total segment cable length (including spur length) is checked to assure that the length does not exceed the maximum segment length allowed by the standard protocol. In the preferred embodiment, the maximum segment length allowed is 6232 feet or 1900 meters. If the total segment cable length exceeds the allowed maximum cable length, then a warning message is presented to the user as indicated at warning message step 918. If the warning message is presented, the control transitions to check voltage step 920. Otherwise, the tool 120 transitions directly to check voltage step 920.

The minimum voltage per segment is checked to assure that the voltage at any device which is coupled to the process control network exceeds or equals the voltage set forth by the standard protocol. In the preferred embodiment, this voltage is 12.5 volts. If the voltage drop is less then the allowed voltage, then a warning message is presented to a user as indicated at warning message step 922. If the warning message is presented, then control transitions to completion step 924. Otherwise, tool 120 transitions directly to completion step 924.

During completion step 924, all of the checked values are reviewed by tool 120 to assure that all values are within their limits. If the values are within their limits, than a congratulations screen presentation is presented to the user as indicated at display step 926 and control returns to the card configuration portion of tool 120. If one or more of the values are not within the limits then the user may access the card configuration portion of tool 120 to revise the process control network design.

Figure 10A:
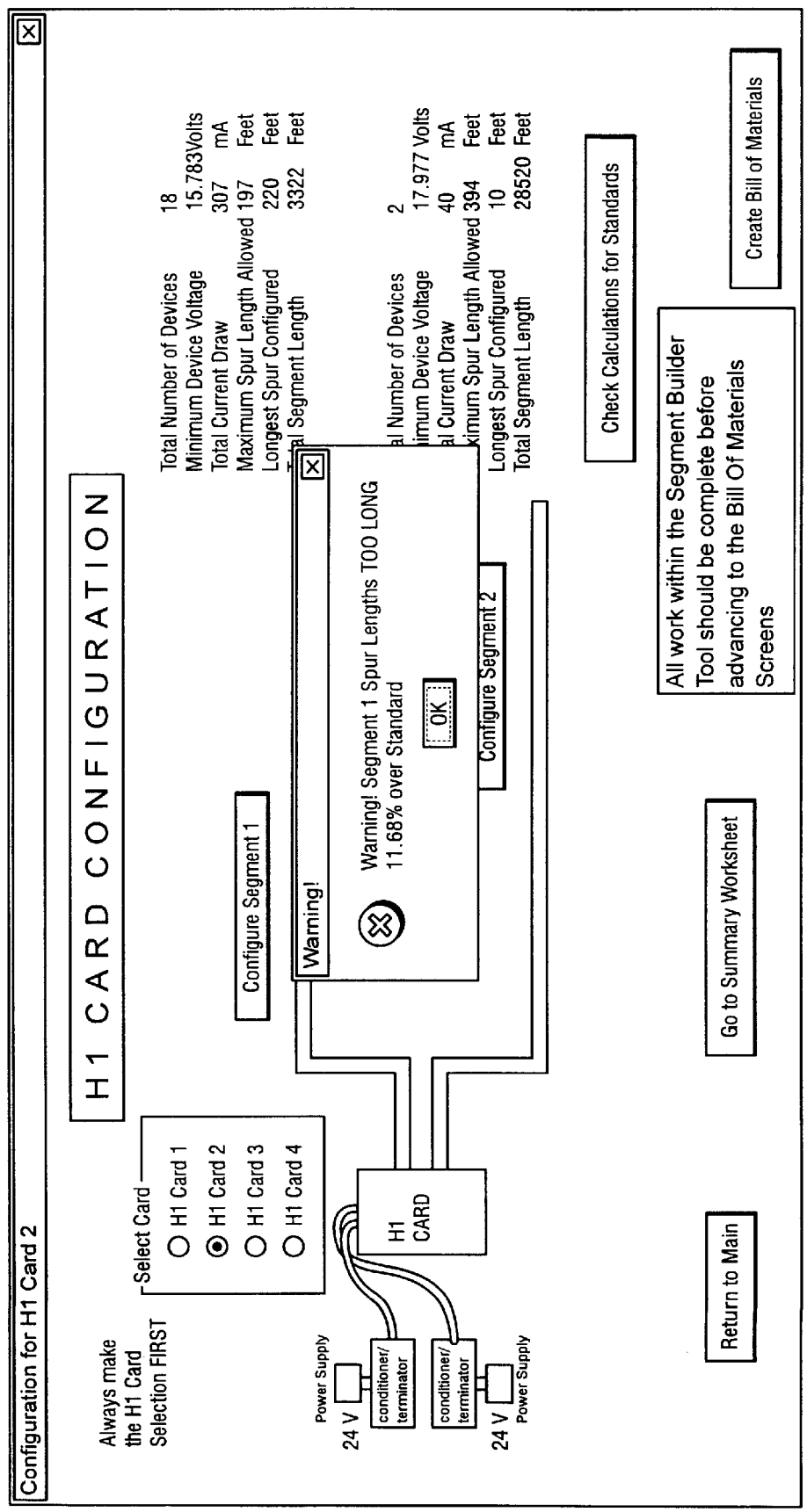
FIGS. 10A–10F are screen presentations of various potential results of the check calculations portion of the topology analysis tool of FIG. 2.
Figure 10B:
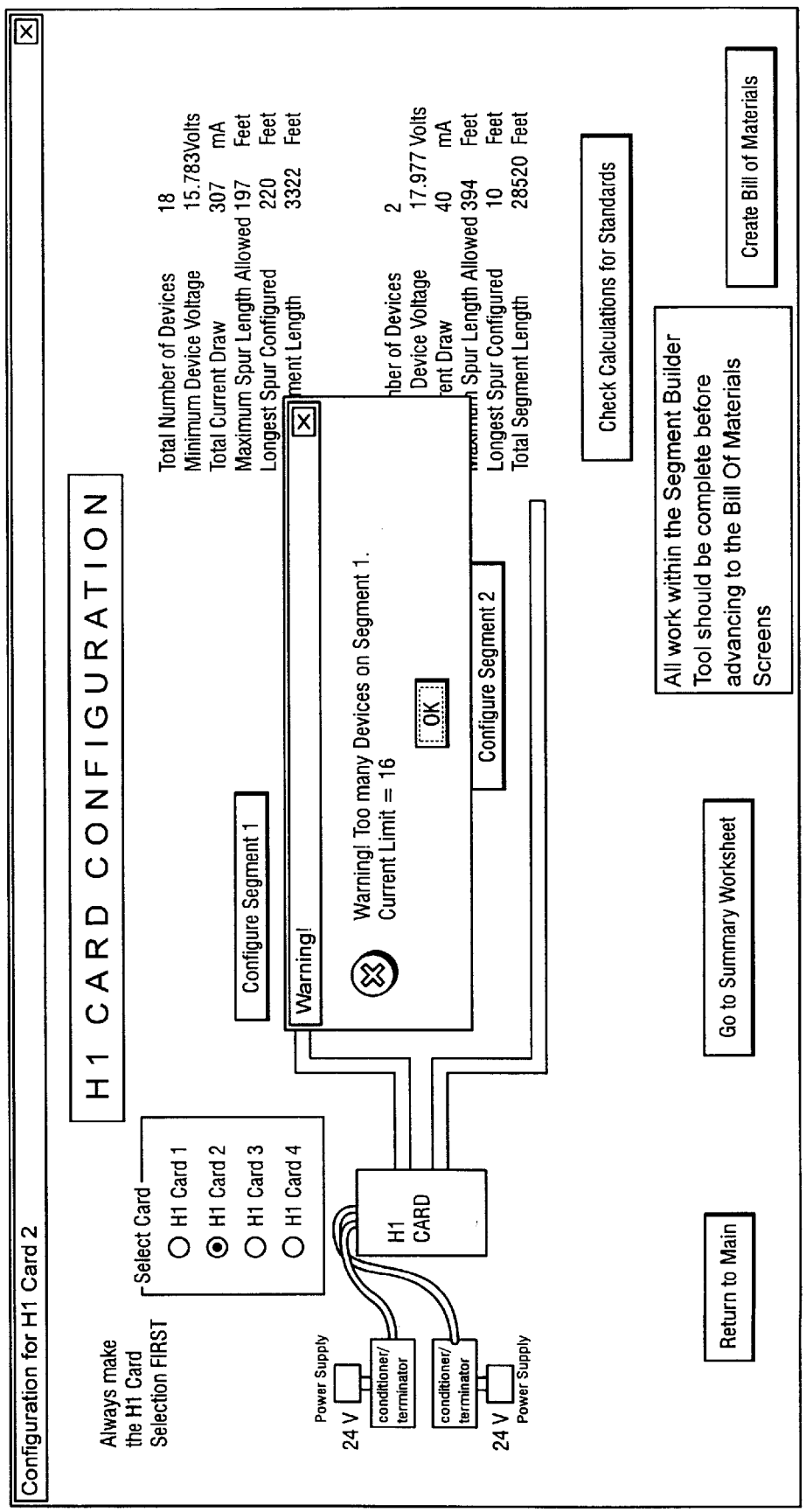
Figure 10C:
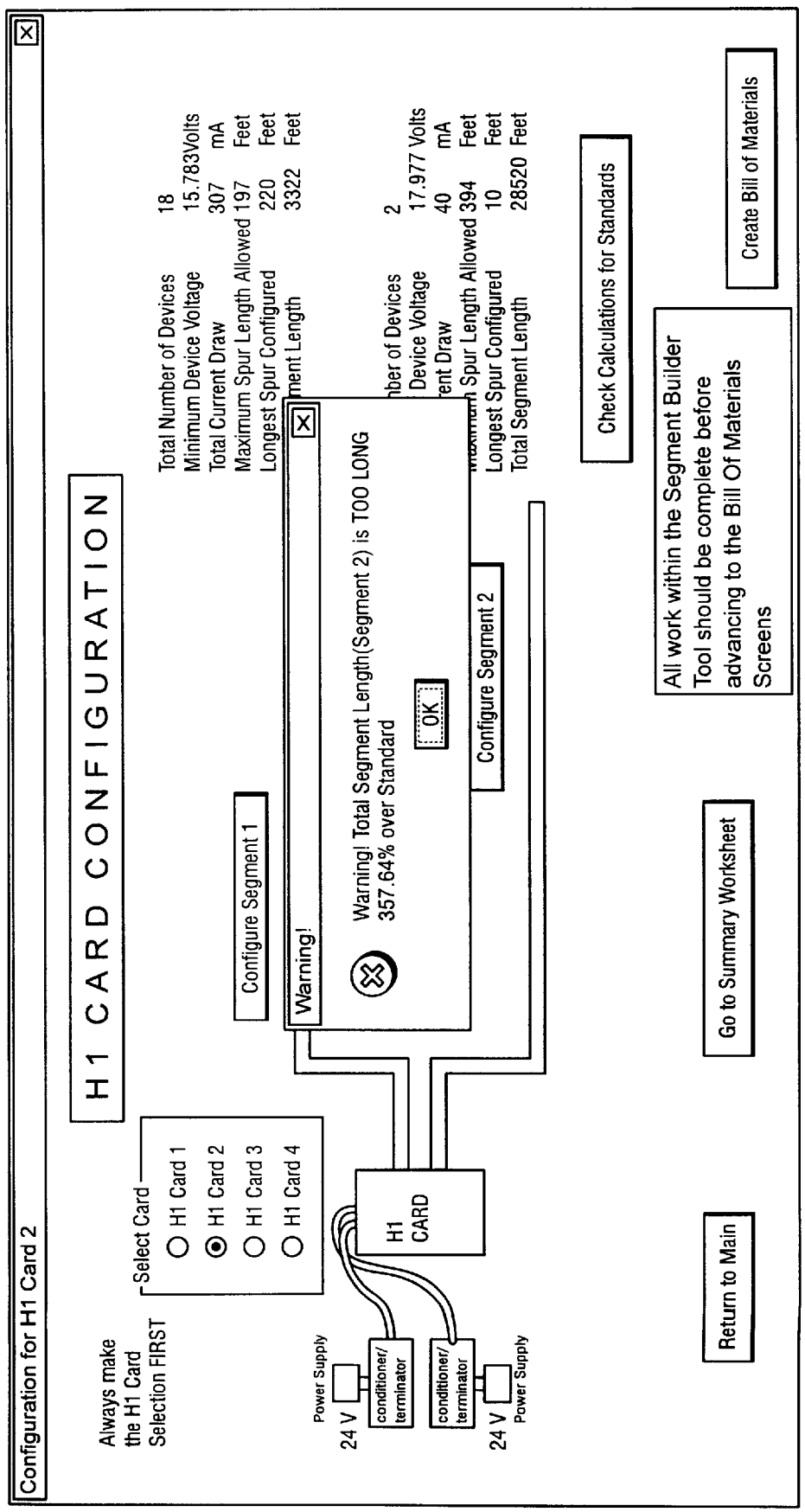
Figure 10D:
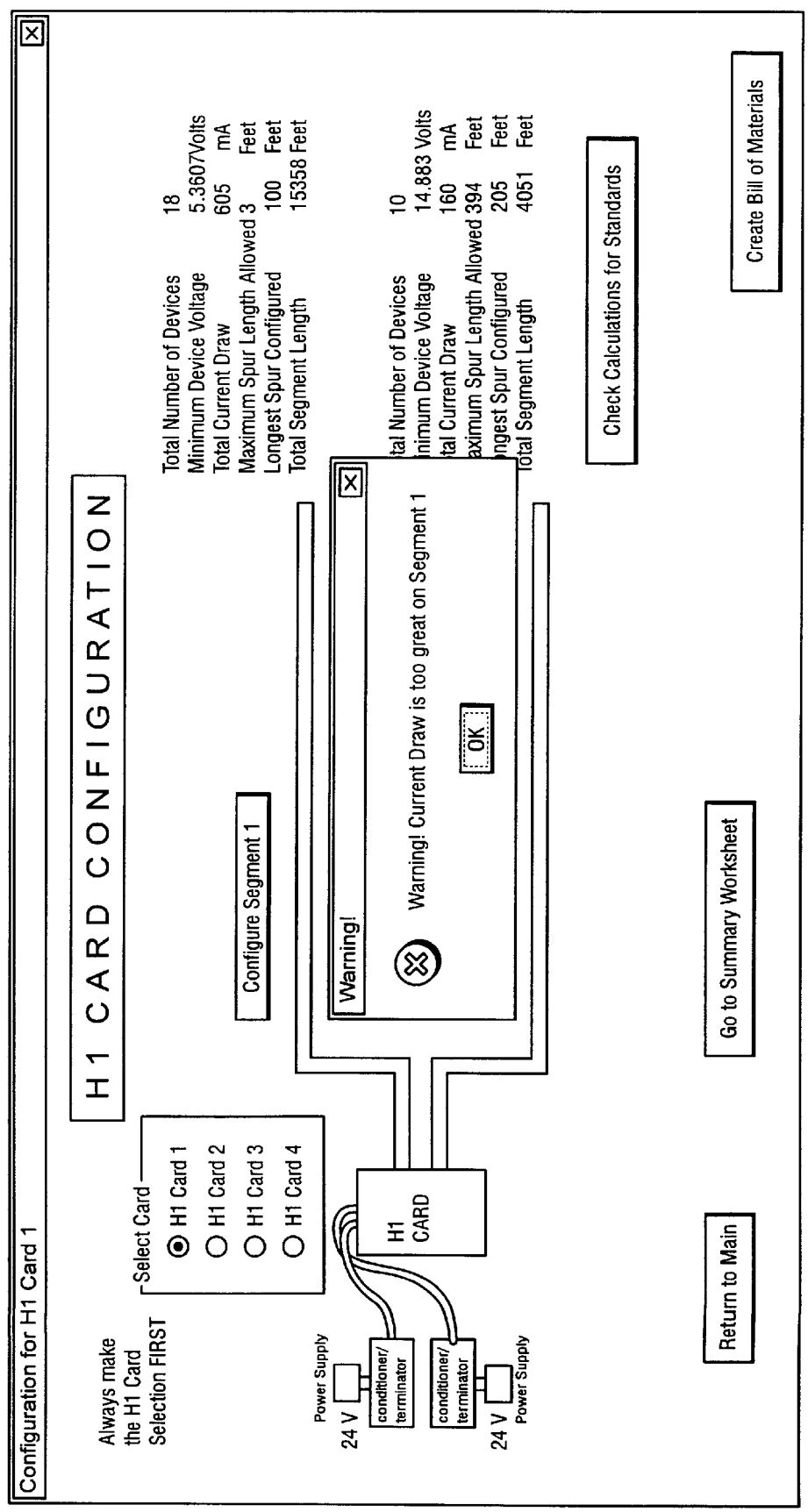
Figure 10E:
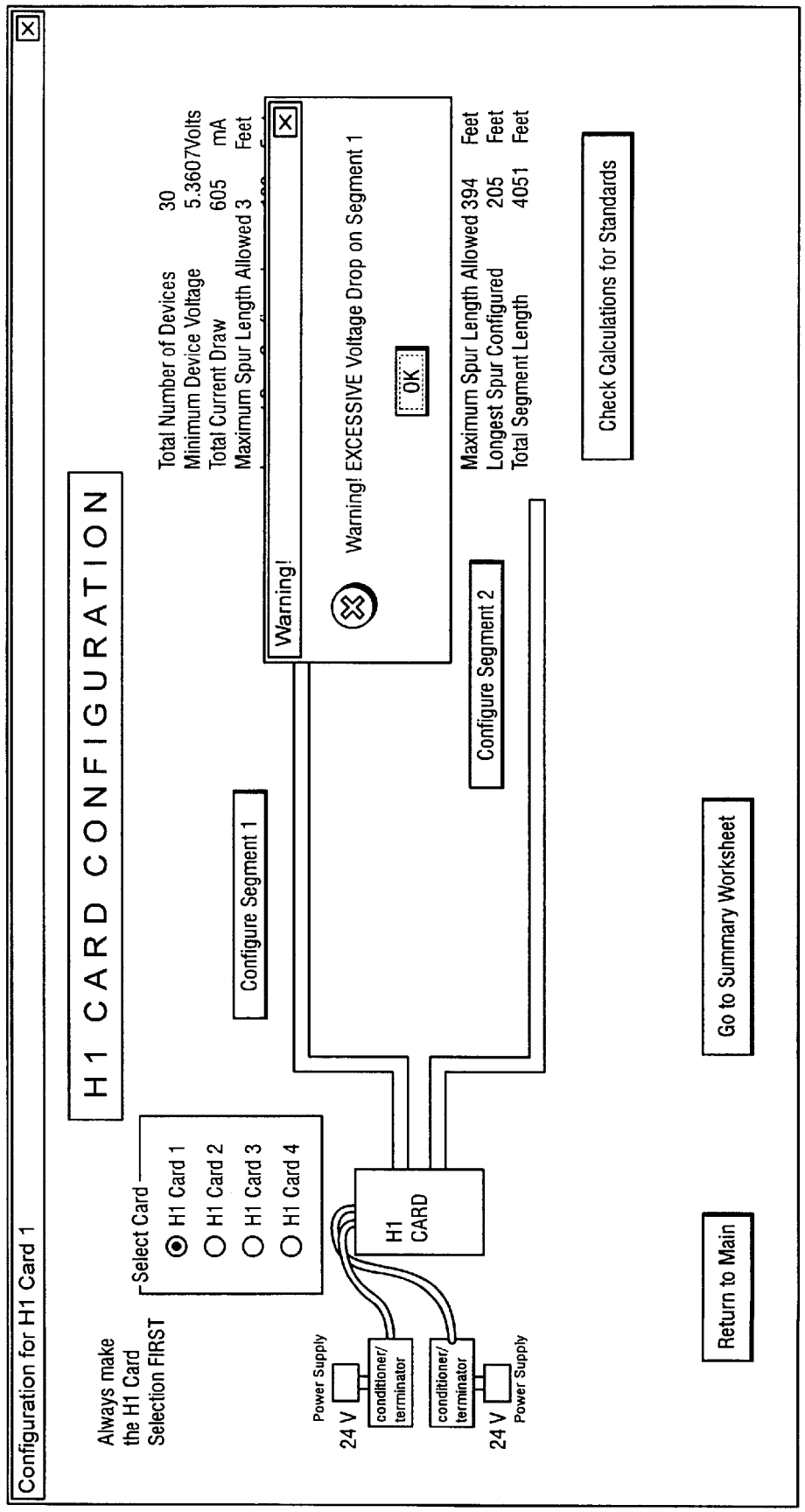
Figure 10F:
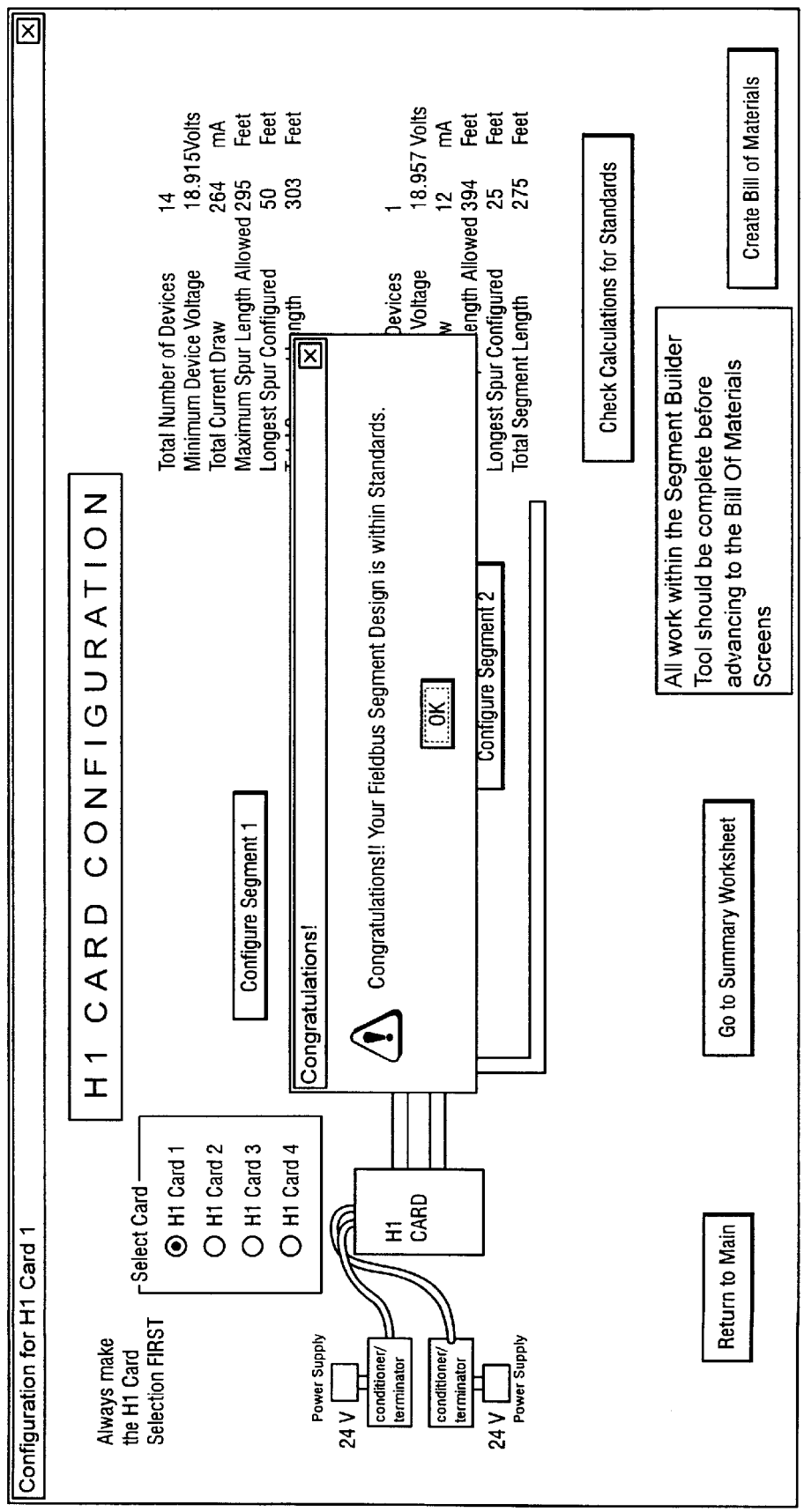

FIG. 10A shows an example of the warning message that is presented to a user at warning message step 904. FIG. 10B shows an example of the warning message that is presented to a user at warning message step 910. FIG. 10C shows an example of the warning message that is presented to a user at warning message step 914. FIG. 10D shows an example of the warning message that is presented to a user at warning message step 918. FIG. 10E shows an example of the warning message that is presented to a user at warning message step 922. FIG. 10B shows an example of the message that is presented at message step 926.

Referring to FIGS. 11A–11C, an example of the summary screen presentation that is presented to a user when summary portion 308 (FIG. 3) is accessed is shown. Summary screen presentation provides summary information about the process control network design that is controller specific. Additionally, within each controller specific portion, the summary information is then segment specific. Preferably the summary screen presentation indicates whether or not the characteristics of the process control network design are within the constraints of the standard protocol. See, e.g., FIG. 11B, controller H1 Card 3 and FIG. 11C controller H1 Card 4.

Other Embodiments

Other embodiments are within the following claims.

For example, while the protocol in which the preferred embodiment is described analyzes a process control network for a Fieldbus protocol, it will be appreciated that any protocol may be analyzed by adjusting the appropriate constraints.

Also, for example, while the preferred embodiment operates under a WINDOWS operating system and uses a Wizard type of presentation, it will be appreciated that these details are not intended to be limiting of the overall concept of the invention.

Also, for example, the tests that are set forth and tested by the preferred embodiment of the tool are not intended to be an exhaustive list of all of the tests that a tool in accordance with the present invention could perform. For example, an analysis tool in accordance with the present invention could also test for communication like activities such as communication throughput checks or the like.

What is claimed is:

1. A method for analyzing a process control network design to meet criteria of a standard protocol, wherein said method allows the design to be analyzed prior to the design being implemented, the process control network having a controller coupled to a field device via a bus, the method comprised of:

providing a computer having a processor and a memory with an analysis tool stored on the memory, the analysis tool including information regarding criteria of the standard protocol;

providing the computer with information regarding a length of the bus;

providing the computer with information regarding a cable type of the bus;

providing the computer with information regarding a voltage requirement of the field device;

using the analysis tool of the computer to analyze the length of the bus, the cable type of the bus and the voltage requirement of the field device to assure that the process control network design conforms to the criteria of the standard protocol, wherein said analysis tool allows the design to be analyzed prior to the design being implemented.

2. The method for analyzing a process control network design of claim 1 further comprised of:

displaying a warning on the computer if the process control network design does not conform to the criteria of the standard protocol.

3. The method for analyzing a process control network design of claim 1 wherein the process control network includes a junction coupled to the bus, the field device being coupled to the junction via a spur; and further comprised of providing the computer with information regarding a length of the spur;

providing the computer with information regarding a cable type of the spur;

using the analysis tool of the computer to analyze the length of the spur, the cable type of the spur to assure that the process control network design conforms to the criteria of the standard protocol.

4. The method for analyzing a process control network design of claim 3 further comprised of:

displaying a warning on the computer if the process control network design does not conform to the criteria of the standard protocol.

5. The method for analyzing a process control network design of claim 1 wherein the process control network includes a plurality of field devices coupled to the junction; and further comprising providing the computer with information regarding how many field devices are coupled to the junction;

using the analysis tool of the computer to analyze the number of field devices included with the process control network design to assure that the process control network design conforms to the criteria of the standard protocol.

6. The method for analyzing a process control network design of claim 5 further comprised of:

displaying a warning on the computer if the process control network design does not conform to the criteria of the standard protocol.

7. The method for analyzing a process control network design of claim 1 wherein the standard protocol substantially conforms to a Fieldbus protocol.

8. A method for analyzing a process control network design to meet criteria of a standard protocol, wherein said method allows the design to be analyzed prior to the design being implemented, the process control network having a controller coupled to a field device via a bus, the method comprised of:

providing an analysis tool with information regarding a length of the bus;

providing the analysis tool with information regarding a cable type of the bus;

providing the analysis tool with information regarding a voltage requirement of the field device;

using the analysis tool to analyze the length of the bus, the cable type of the bus and the voltage requirement of the field device to assure that the process control network design conforms to the criteria of the standard protocol, wherein said analysis tool allows the design to be analyzed prior to the design being implemented.

9. The method for analyzing a process control network design of claim 8 further comprised of:

displaying a warning if the process control network design does not conform to the criteria of the standard protocol.

10. The method for analyzing a process control network design of claim 8 wherein the process control network includes a junction coupled to the bus, the field device being coupled to the junction via a spur; and further comprised of providing the analysis tool with information regarding a length of the spur;

providing the analysis tool with information regarding a cable type of the spur;

using the analysis tool to analyze the length of the spur, the cable type of the spur to assure that the process control network design conforms to the criteria of the standard protocol.

11. The method for analyzing a process control network design of claim 10 further comprised of:

displaying a warning if the process control network design does not conform to the criteria of the standard protocol.

12. The method for analyzing a process control network design of claim 8 wherein the process control network includes a plurality of field devices coupled to the junction; and further comprising providing the analysis tool with information regarding how many field devices are coupled to the junction;

using the analysis tool to analyze the number of field devices included with the process control network design to assure that the process control network design conforms to the criteria of the standard protocol.

13. The method for analyzing a process control network design of claim 12 further comprised of:

displaying a warning if the process control network design does not conform to the criteria of the standard protocol.

14. The method for analyzing a process control network design of claim 8 wherein the standard protocol substantially conforms to a Fieldbus protocol.

15. An apparatus for analyzing a process control network design to meet criteria of a standard protocol, wherein said apparatus allows the design to be analyzed prior to the design being implemented, the process control network having a controller coupled to a field device via a bus, comprising:

a computer having a processor and a memory with an analysis tool stored on the memory, the analysis tool including information regarding criteria of the standard protocol;

means for providing the computer with information regarding a length of the bus;

means for providing the computer with information regarding a cable type of the bus;

means for providing the computer with information regarding a voltage requirement of the field device;

wherein the analysis tool analyzes the length of the bus, the cable type of the bus and the voltage requirement of the field device to assure that the process control network design conforms to the criteria of the standard protocol, and wherein said analysis tool allows the design to be analyzed prior to the design being implemented.

16. The apparatus for analyzing a process control network design of claim 15 further comprising:

means for displaying a warning on the computer if the process control network design does not conform to the criteria of the standard protocol.

17. The apparatus for analyzing a process control network design of claim 15 wherein the process control network includes a junction coupled to the bus, the field device being coupled to the junction via a spur; and further comprising means for providing the computer with information regarding a length of the spur; and means for providing the computer with information regarding a cable type of the spur;

wherein the analysis tool of the computer analyzes the length of the spur, the cable type of the spur to assure that the process control network design conforms to the criteria of the standard protocol.

18. The apparatus for analyzing a process control network design of claim 17 further comprising:

means for displaying a warning on the computer if the process control network design does not conform to the criteria of the standard protocol.

19. The apparatus for analyzing a process control network design of claim 15 wherein the process control network includes a plurality of field devices coupled to the junction; and further comprising means for providing the computer with information regarding how many field devices are coupled to the junction;

wherein the analysis tool of the computer analyzes the number of field devices included with the process control network design to assure that the process control network design conforms to the criteria of the standard protocol.

20. The apparatus for analyzing a process control network design of claim 19 further comprising:

means for displaying a warning on the computer if the process control network design does not conform to the criteria of the standard protocol.

21. The apparatus for analyzing a process control network design of claim 15 wherein the standard protocol substantially conforms to a Fieldbus protocol.

22. An apparatus for analyzing a process control network design to meet criteria of a standard protocol, wherein said apparatus allows the design to be analyzed prior to the design being implemented, the process control network having a controller coupled to a field device via a bus, the apparatus comprising:

computer readable media; and an analysis tool stored on the computer readable media, the analysis tool including means for providing an analysis tool with information regarding a length of the bus;

means for providing the analysis tool with information regarding a cable type of the bus;

means for providing the analysis tool with information regarding a voltage requirement of the field device;

means for analyzing the length of the bus, the cable type of the bus and the voltage requirement of the field device to assure that the process control network design conforms to the criteria of the standard protocol, wherein said means for analyzing allows the design to be analyzed prior to the design being implemented.

23. The apparatus for analyzing a process control network design of claim 22 wherein the analysis tool further comprises:

means for displaying a warning if the process control network design does not conform to the criteria of the standard protocol.

24. The apparatus for analyzing a process control network design of claim 22 wherein the process control network includes a junction coupled to the bus, the field device being coupled to the junction via a spur; and the analysis tool further includes means for providing the analysis tool with information regarding a length of the spur;

means for providing the analysis tool with information regarding a cable type of the spur;

means for analyzing the length of the spur and the cable type of the spur to assure that the process control network design conforms to the criteria of the standard protocol.

25. The apparatus for analyzing a process control network design of claim 24 wherein the analysis tool further comprises:

means for displaying a warning if the process control network design does not conform to the criteria of the standard protocol.

26. The apparatus for analyzing a process control network design of claim 22 wherein the process control network includes a plurality of field devices coupled to the junction; and the analysis tool further includes means for providing the analysis tool with information regarding how many field devices are coupled to the junction; and means for analyzing the number of field devices included with the process control network design to assure that the process control network design conforms to the criteria of the standard protocol.

27. The apparatus for analyzing a process control network design of claim 26 further comprising:

means for displaying a warning if the process control network design does not conform to the criteria of the standard protocol.

28. The apparatus for analyzing a process control network design of claim 22 wherein the standard protocol substantially conforms to a Fieldbus protocol.

* * * * *